(12) United States Patent
Gilbreath

(10) Patent No.: US 8,342,474 B2
(45) Date of Patent: Jan. 1, 2013

(54) MODULAR SUPPORT, ASSEMBLIES, METHODS AND SYSTEMS

(75) Inventor: Donald R. Gilbreath, Castle Rock, CO (US)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 12/380,996

(22) Filed: Mar. 6, 2009

(65) Prior Publication Data

US 2009/0224111 A1    Sep. 10, 2009

Related U.S. Application Data

(60) Provisional application No. 61/068,500, filed on Mar. 7, 2008.

(51) Int. Cl.
*F16M 13/00* (2006.01)

(52) U.S. Cl. ....... 248/558; 248/68.1; 248/74.4; 165/162

(58) Field of Classification Search .................. 248/558, 248/512, 65, 68.1, 73, 74.4; 165/78, 82, 165/162

See application file for complete search history.

(56) References Cited

U.S. PATENT DOCUMENTS

| | | | | |
|---|---|---|---|---|
| 4,618,114 A | * | 10/1986 | McFarland | 248/65 |
| 4,919,372 A | * | 4/1990 | Twist et al. | 248/56 |
| 5,123,547 A | * | 6/1992 | Koch | 211/59.4 |
| 5,794,897 A | * | 8/1998 | Jobin et al. | 248/74.4 |
| 5,921,509 A | | 7/1999 | Flood et al. | 248/58 |
| 6,053,456 A | * | 4/2000 | Dispenza | 248/56 |
| 6,227,502 B1 | * | 5/2001 | Derman | 248/74.4 |
| 6,378,811 B1 | * | 4/2002 | Potter et al. | 248/68.1 |
| 6,378,813 B1 | * | 4/2002 | Gretz | 248/68.1 |
| 6,561,466 B1 | * | 5/2003 | Myers et al. | 248/74.4 |
| 6,715,247 B1 | * | 4/2004 | Sanftleben et al. | 52/220.8 |
| 6,889,944 B2 | * | 5/2005 | Brandzel et al. | 248/68.1 |
| 7,281,356 B2 | * | 10/2007 | Sanftleben et al. | 52/220.8 |

(Continued)

FOREIGN PATENT DOCUMENTS

| | | |
|---|---|---|
| DE | 3824197 A1 | 1/1990 |
| GB | 1583312 | 1/1981 |
| JP | 56000966 | 1/1981 |

(Continued)

OTHER PUBLICATIONS

Notification of Transmittal of the International Search Report and the Written Opinion of the International Searching Authority, or the Declaration, Date of Mailing Jun. 15, 2009, International Application No. PCT/US2009/001477.

*Primary Examiner* — Bradley Duckworth
(74) *Attorney, Agent, or Firm* — P. N. Dunlap, Esq.; J. A. Thurnau, Esq.

(57) ABSTRACT

A modular support assembly receives and/or stores elongated objects that may be primarily cylindrical in shape, such as fluid conduits including hydraulic tube, pipe and hose. The modular support assembly includes a plurality of interchangeable modules of differing or similar sizes to create an adjustable assembly whose overall shape and number of modules can change depending upon the intended use of the assembly. The modules comprise sliding engagement portions that are disposed along a periphery of the modules and allow interengageable attachment to other modules. The modules also comprise apertures that can vary in size to accommodate various sizes of objects. The modules can be disassembled by sliding module portion halves apart, facilitating easy assemblage of the modules either before or after the objects retained therein have been positioned, and subsequent removal of individual objects from the assemblage.

41 Claims, 4 Drawing Sheets

U.S. PATENT DOCUMENTS

| | | | |
|---|---|---|---|
| 2004/0056156 A1* | 3/2004 | Dodson | 248/59 |
| 2008/0296443 A1* | 12/2008 | Lunitz et al. | 248/65 |
| 2009/0218451 A1* | 9/2009 | Lundborg | 248/56 |
| 2009/0277524 A1* | 11/2009 | Benz et al. | 138/108 |

FOREIGN PATENT DOCUMENTS

| | | |
|---|---|---|
| JP | 10160049 | 6/1998 |
| JP | 10299951 | 11/1998 |

* cited by examiner

MODULAR SUPPORT, ASSEMBLIES, METHODS AND SYSTEMS

CROSS-REFERENCE TO RELATED APPLICATION

This application claims the benefit of U.S. Provisional Application No. 61/068,500, entitled Modular Support Assembly, Methods and Systems, filed Mar. 7, 2008, which is incorporated herein by reference.

BACKGROUND OF THE INVENTION

1. Field of the Invention

This invention relates generally to support systems for objects, more particularly to modular assemblies for supporting elongated objects that may be primarily cylindrical in shape, and specifically to assemblies of interchangeable modules of differing or similar sizes to create adjustable assemblies whose overall shape and number of modules can vary depending upon the intended use of an assembly.

2. Description of the Prior Art

Supports for generally cylindrical objects, including fluid conduits such as hydraulic pipe, tube, and hose, are known. Such supports typically include an apparatus that securely receives and stores bundles of pipes, tubes and/or hoses while maintaining separation of individual lines. The support apparatus usually includes supportive blocks or clips that may be welded to the conduits in an expensive process that requires post-finishing operations, and these blocks may have several unique, difficult to install parts that are made specifically for the application. The blocks may be attached to each other by independent attachment pieces. These attachment pieces may comprise vertical locking strips that engage with the blocks to affix one block to the next. Each block may comprise several apertures, so that within each block, several hoses may be received. In other supports, support members having vertical rows of apertures may comprise retaining arms that hingedly extend from a base portion of the support member and snap into a top portion of the support member to retain the hoses. One disadvantage of this system is that if the arm is not properly locked into place, there exists no tell-tale sign that anything is amiss. Still other supports include blocks that can be stacked on top of one another but not side-by-side.

One example of a support system for fluid conduits can be found in U.S. Pat. No. 5,992,802 to Campbell. Campbell appears to be an attempt to provide stackable support members for coaxial cable. In Campbell '802, pairs of blocks are stacked upon one another and are connected by a single threaded rod or bolt. The blocks are identical and have semi-circular recesses that cooperate to provide circular, cable-gripping passages. The threaded rod or bolt extends in orthogonal relationship to the axes of the cable-gripping passages through other passages located between two of the circular, cable-gripping passages. The cables are installed and removed by longitudinally inserting them through the passages or by loosening a nut on the rod, separating the blocks of a cooperating pair, and sliding the cables into and out of the passages.

A disadvantage of Campbell '802 and many other currently available hose and pipe supports is that each support portion or block typically comprises a multitude of apertures to receive multiple pipes. Therefore, in order to add/remove one pipe to/from an assembly of pipes, an entire row of apertures (and therefore one block) must be removed to access the intermediate row of pipes that retains the desired pipe. As such, the overall configuration of the assembly is altered. In most cases, this requires removing the inhibiting surrounding row(s), disrupting the entire assembly, and increasing labor cost. Disassembling the entire assembly becomes impossible in areas having low clearances such as certain equipment, mechanical rooms and other storage locations, trucks, trailers, and other transport vehicles. Moreover, the support portions or blocks of most currently available hose and pipe support systems rely on a separate means of attachment to affix one support portion or block to the next. Usually, these separate means of attachment comprise bolts, which negatively impact the cost of materials and installation. In still other support systems, there is no means at all for securing one support block to another. There is no provision in any of the currently available pipe support systems for support portions or modules that comprise portions that can be placed around pipes post-installation.

SUMMARY

The present invention is directed to systems and methods which provide secure, variable, modular support for multiple objects. An example of a support system that exhibits superior organization of objects can be seen in embodiments of the present invention. The present modular support assembly comprises a system of bracketry in the form of modules that can be put together in many configurations and used in a multitude of applications. In particular, the present modular support assemblies, methods and systems advantageously provide a flexibility to capture individual conduits and then lock multiple conduits together in various configurations, as needs may dictate. Although embodiments of the present modular support assembly can be used to support and transport many types of objects, particularly elongated objects, the modular support assembly is preferably used for the housing, transport, and support of elongated objects having a generally cylindrical cross-section, such as individual and bundled fluid conduits, including hydraulic hoses, tubes, and pipes. The use of a modular configuration results in reduced part count and cost via standardization, and allows fluid conduits to be pre-bundled at the supplier level prior to equipment installation. The present modular support assembly may therefore be an attractive stock item for fluid conduit distributors.

While other modular shapes are contemplated, parallelepiped, rectangular, triangular, or other-shaped cross-sections, various embodiments of the present invention have modules of a generally block-type shape. The present modular support assembly comprises an assembly of these interchangeable modules. The modules can comprise a variety of sizes and can be placed around the fluid conduits either before or after the conduits have been bundled or placed. Each individual module comprises an aperture that receives one conduit. The ability to place the module around (or onto) the conduit before or after installation of the conduit is made possible by sliding the entire module over/onto the conduit or by providing modules that comprise two, preferably interchangeable module portions or halves, each portion comprising approximately one half of the module, wherein the portions are slidably removable from one another along a longitudinal plane of the conduit retained therein. Other embodiments of the present invention may provide modules having two parts that differ vastly in size. Each module can be removed from the assembly in its entirety or in part. When one module portion is removed from the other module portion, a "pick and place" method of inserting the conduit into the module's aperture can be employed. This is a very beneficial feature of the design because it allows for conduit accessibility and maneuverability in tight spaces. An important advantage of the present embodiment is that a module can be moved to different parts of the assembly, including beside or underneath another module. The ability to move the modules from beside one another to below/above one another provides versatility in support. For example, a flipped module could act as a spacer during emergency repair. A further advantage of each module receiving one conduit is that removal of one object can be achieved while maintaining the overall structure of a modular support assembly. The present invention provides a non-disruptive, easy to implement method of storing, transporting, and separating objects, including hydraulic fluid conduits and becomes very beneficial when long lengths of pipe or tube are transported or installed together.

In various embodiments, the modules are cube-like in structure, having six sides. The dimensions and shape of the modules can vary depending upon the intended use of the assembly. For example, modules having a thickness that is greater than their width and height dimensions may be well suited for large diameter, heavy conduits. In cube-like module embodiments, similarly and differently-sized modules are engaged with one another by a system of slidable, interlocking engagement portions, such as slide and groove fasteners or joints, disposed along the periphery of the modules. The slide and groove joints may include interlocking fan-shaped tails and sockets as seen in sliding dovetail joints. Each block has, on at least four of its sides, including the top, bottom, left, and right sides, alternating tails and sockets. Thusly, depending on the number of tails and sockets per side, where there is a tail on a left side of the module, at the same location on a module's opposing (right) side there will be a socket. Similarly, where there is a tail on the bottom side of the module, at the same location on the module's opposing (top) side there will be a socket. The size, placement, and design of the engagement portions are preferably the same on each module, regardless of the size of the module itself. This similarity in the size of the tail and socket facilitates engagement of any size of module with any other size of module. Because of this design of the module, large and small modules can be removed from the modular support assembly by removing module portions or whole modules at will. This allows for spontaneous creation of support along any portion of the fluid conduit, post-installation. An example of when this feature might be desirable is when a large outside diameter (OD) conduit such as an oil pipe needs repair and this large OD pipe is bundled with other, possibly smaller fluid conduits.

The interlocking fan-shaped tails and sockets may be chamfered to create a minimal amount of friction between the tails and sockets. This may be of particular use during installation. In accordance with the present invention, the tails and sockets could comprise any type of finished shape and/or cross-section. Furthermore, while some embodiments of the modular assembly may comprise modules of a rigid or semi-rigid material, it should be understood that any material could be used in the construction of the modules, depending upon the intended use of individual modules or of the entire assembly. A benefit of various embodiments is the ability to bundle together different families of tubes having different performance functions by providing a dedicated aperture in each module so that when an assembly houses different types of tubes, it becomes easy to pair a module of one material with a module of a different material. The material used in the construction of the modules can therefore comprise polymer, metal, ceramic, metal infused, nano-materials, or any other material.

Large inside diameter (ID) lines are the hardest to bend and maneuver, especially in tight spaces. Alternatively, small ID hoses can be routed in tighter areas, making future changes or additions convenient. Various embodiments of the present invention provide a system in which any size of hose could be inserted, maintained, or removed and replaced without disrupting the overall shape of the assembly. Each module can be modified to accommodate objects of varying cross-section. Aperture inserts may be employed to alter the size and/or shape of the original aperture to accommodate varying sizes of fluid conduits with a module.

Thus, in accordance with embodiments of the present invention a method of adding and removing at least one module, that receives an object, to an assembly of a plurality of modules, may comprise sliding the modules relative to one another in an engageable/disengageable and interchangeable fashion along a longitudinal plane of the object received therein, and separating the modules from one another by removing portions of the modules from the modules to remove the object received therein, while the assembly of modules maintains its original structural integrity. In accordance with embodiments of such methods, the modules thus slidably engaged with one another may comprise varying sizes, or inserts of varying sizes, to facilitate storing and transporting objects of varying sizes.

In accordance with embodiments of the present invention a support assembly for supporting and maintaining separation of hoses, tubes, and pipes may comprise a plurality of support modules. Each support module may comprise an aperture that receives a hose, tube, pipe, or the like, and may have at least one engagement portion disposed along a periphery of the support module. The support modules may be removably attachable to and in exchangeable relationship with each other by engaging the engagement portions such that the support modules cooperate in a removable yet generally rigid manner. The support modules may vary in size to accommodate varying sizes of hose, tube, or pipe retained therein, and are preferably interchangeably engaged with one another.

Hose supports are particularly desirable when hoses or tubes need to be braced to equipment and kept in place, or when bundles of hoses or tubes are to be run alongside one another. Such support may be desirable at a hose flex point, for carrying hydraulic conduits overhead, for long tubes such as on a boom, or simply where several differing lines used in the same system converge in one location and it becomes desirable to maintain organization and identification of the individual lines.

To address vibration and noise within a hose bundle, dangerous kinking of hoses, entanglement,. incorrect hose identification, and inadequate support, the present system ensures proper routing of the conduit(s). When hydraulic hose assemblies need to be replaced, two main objectives are kept in mind: to make the system as leakproof as possible, and to provide accessibility to the conduits for maintenance. It is commonly recommended that a replacement hose be rated at half the SAE bend radius specification as an original equipment hose in an application. Hence, the present systems and methods accommodate replacement hoses that may behave, move, and/or may be of a different size and material from their predecessor. The present system is a lightweight, durable, and accessible support system that can provide reliable security for hoses, tubes, and pipes of various sizes, comprising modules that are easy to install around previously positioned conduits and that are just as easily disassembled. Also, the present systems and methods provide a support system for hoses of varying applications within one bundle. For example, hose bundles for hydraulic power steering systems comprise a high pressure and a low pressure line. These lines may be of different diameter or material (e.g. one line might be a steel tube and the other a hose). It may be beneficial to provide different material for the high pressure line support module from that of the low pressure line support module material, as well as support for the different diameters. Another benefit of the present invention is that is allows the interchange of modules of same or differing material and size depending upon the use of the assembly, allowing the same modules to be used in different applications. For example, hose support for farm equipment and oil lines may require heavy, durable modules that could be used for either application; conversely, the medical and dentistry industries could each employ and interchange modules that are smaller and lighter in weight to support light tubing.

Hydraulic hose is generally intended to flex, but not twist. Lab tests show that if a large inner diameter (ID), high-pressure hydraulic hose is twisted only seven degrees, its service life may be reduced by ninety percent. High-pressure hose should not be routed through several bends, and, when the hose must flex, it should be routed through the pivot point around which the hose traverses. The interchangeable system of differently-sized modules of the present invention can help maintain the optimum and most efficient flexing of the hose lines, and can provide efficient support to even short lengths of hose while keeping the hose within the contour of the machine. When a hose is pushed, rather than bent, the hose has a tendency to form an "S-bend". An S-bend installation results in excessive hose movement and diminished service life. Proper hose support can prevent S-bends from occurring. Hence the present systems and methods can be used to create different assembly configurations to navigate tight corners and small spaces commonly found on machinery, in maintenance rooms, and on trailers.

Hydraulic hoses can elongate and contract during pressurization cycles. Embodiments of the present invention provide a system in which the material used to support the hoses preferably does not hinder fluid flow within the fluid conduit. Various materials used in the construction of the modules could aid in energy dissipation, thermal insulation, or noise and vibration dampening.

It is possible in hydraulic installations to alter the hydraulic line design by the addition or subtraction of lines, or by a change in the type or size of the fitting which is found in such a line. Advantageously, the present systems and methods provide a support assembly which is adjustable or alterable to readily permit the number of supported lines to vary, and allow types and sizes of couplings to be altered without redesigning the entire support structure.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 1:
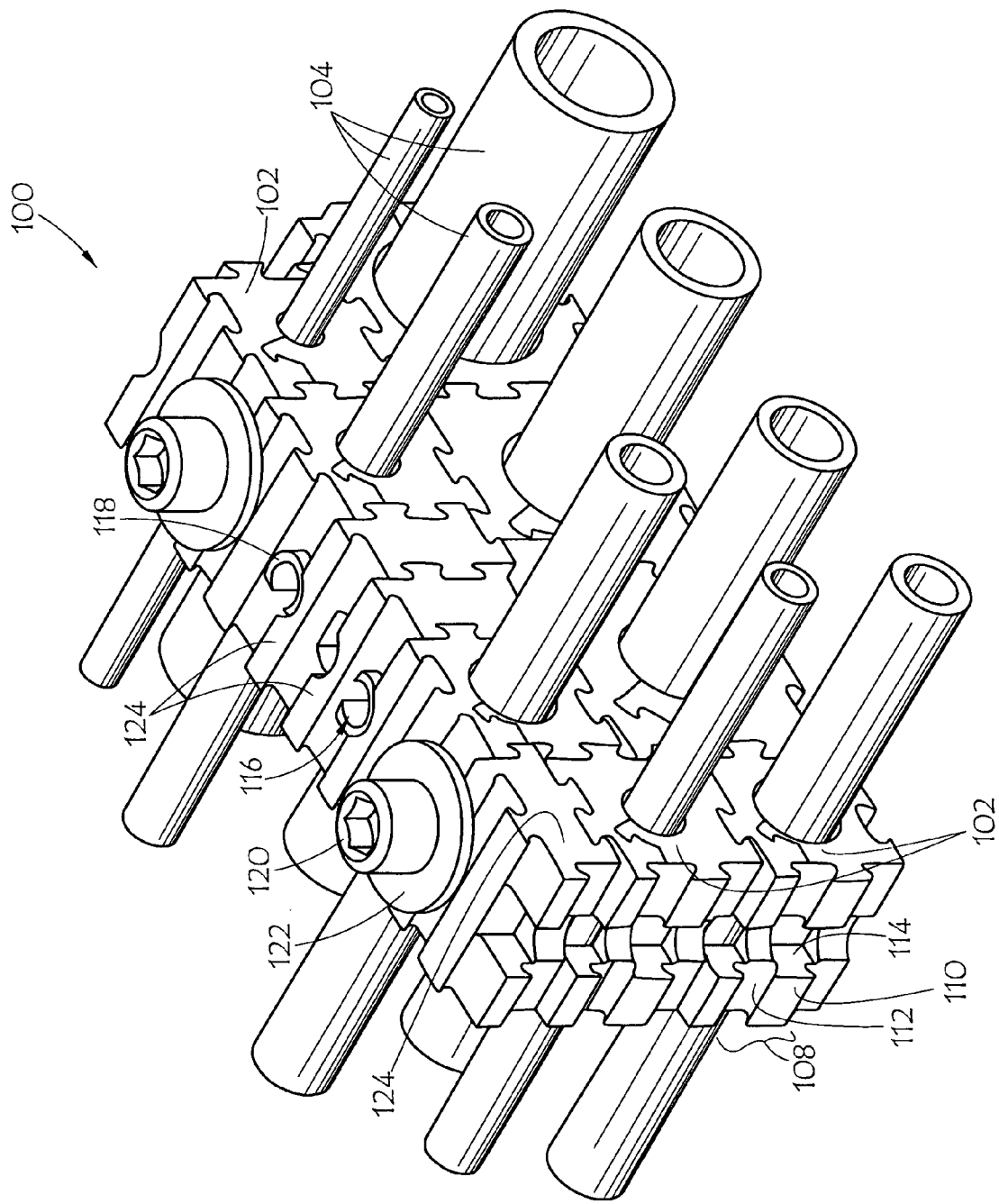
FIG. 1 is an environmental perspective view of a modular support assembly employing an embodiment of the present invention and showing the ability of the modular support assembly to store differently-sized fluid conduits.

Referring to FIG. 1, embodiment 100 of the present invention is shown supporting a varying number and sizes of elongated, generally cylindrical objects 104. In various embodiments of the present invention, the cylindrical objects may comprise fluid conduits. However, it should be understood that the present assemblies can receive, support, transport, and store objects having virtually any cross section, including square, elliptical, oblong, or oval-shaped cross sections as well as objects of virtually any type or size including airplane fuselages or portions thereof, machinery parts, construction components, medical, sports, or other equipment, large oil pipe lines, transport vessels, etc.

Figure 2:
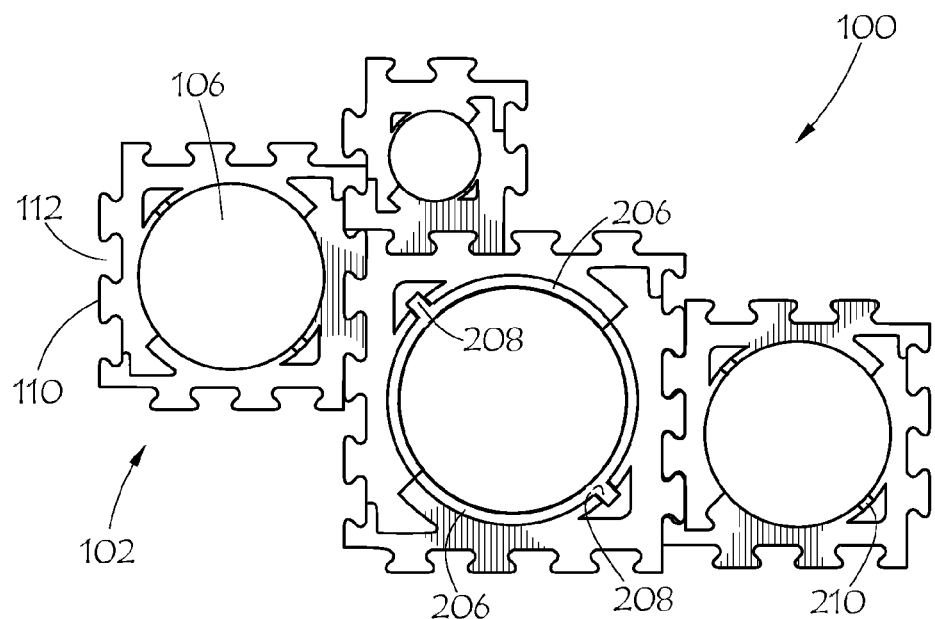
FIG. 2 is a front view of another possible combination of module embodiments, having a variety of apertures sizes, as well as an insert which may be used in some embodiments.
Figure 3:
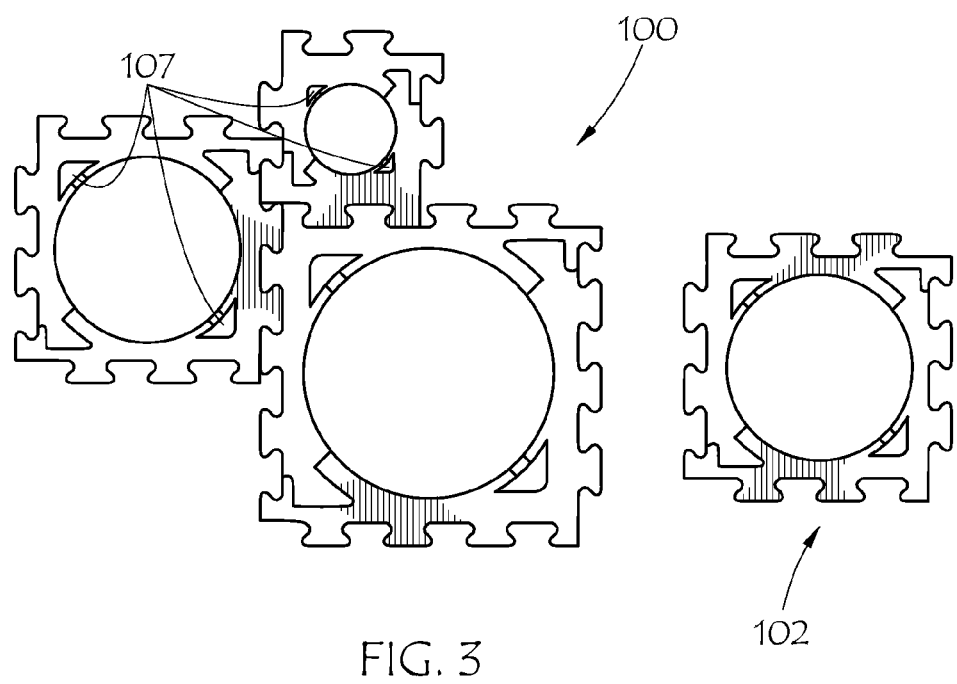
FIG. 3 is a front view of an assembly, similar to the assembly shown in FIG. 2, with the right-most module removed.
Figure 4:
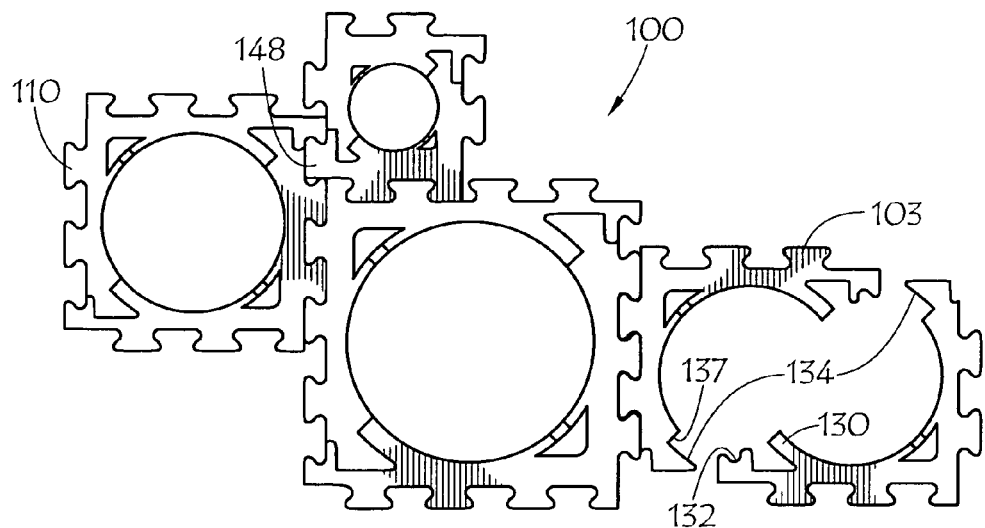
FIG. 4 is a front view of the configuration of the assembly shown in FIG. 3 with a portion of the right-most module removed.

Turning to FIGS. 2-4, in various embodiments of the present invention, the fluid conduits may comprise hydraulic hose, pipe and tube. A bundle of various cross sections of conduit is supported by modular support assembly 100 comprised of modules 102. Modules 102 may comprise varying sizes and include an aperture 106. Aperture 106 may be sized to receive conduits of standard or non-standard sizes. Aperture 106 may have a smooth edge and may be generally circular in shape. In accordance with the present invention, the size and shape of aperture 106 may vary depending upon the type, size, and shape of the object to be received therein. As shown in FIG. 2 aperture 106 may receive insert halves 206, which may be used to allow a module to accept a smaller conduit or the like. Insert halves 206 may be "snap-fitted" in place by insertion of tab 208 into slot 210 defined by relief 107. Tab 208 may have a leg or catch extending backward into relief 107, engaging the edge of slot 210 to help retain the insert in aperture 106.

As shown by the figures, modules 102 may comprise engagement portions 108. Engagement portions 108 may comprise any type of engagement portion having the ability to fasten together two separate structures in a secure manner. Preferably, engagement portions 108 can be easily disengaged, such as by sliding, for example, in a plane that is longitudinal to the object retained therein. This ease of installation provided by easily disengageable, yet generally rigid, engagement portions becomes beneficial when it is desirable to place the module 102 around fluid conduit 104 or the like, particularly after the fluid conduit has been installed. Such engagement portions further allow great versatility during installation which in turn cuts down on maintenance, installation, and manufacturing cost. For example, should it be desired that another configuration be provided quickly the present invention provides a neat, simple, secure way of changing the configuration of assembly 100 very quickly in the field, while maintaining the original integrity of the assembly.

Figure 6:
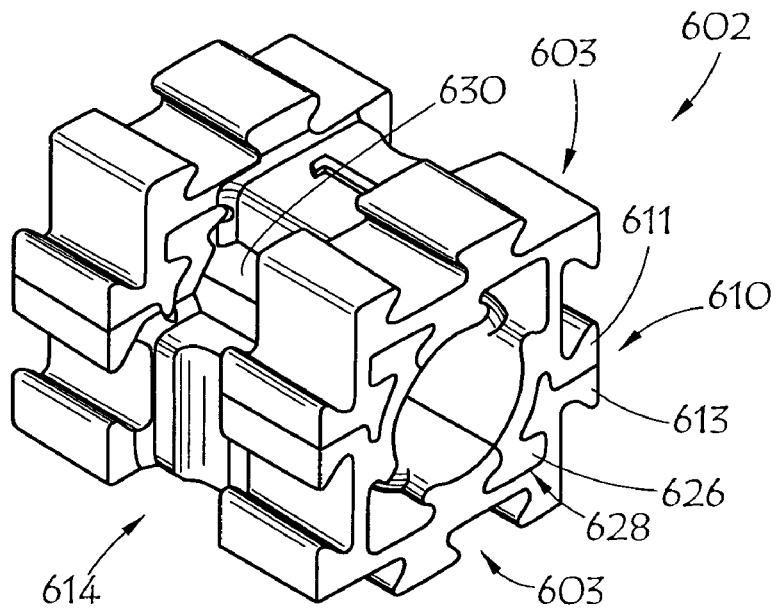
FIG. 6 is a perspective view of another embodiment of a single module of the present invention, with the portions thereof joined together.

Engagement portion 108 can comprise tails 110 and sockets 112, similar to dovetail joints found in woodworking. In various embodiments of the present invention, several sliding dovetail joints are used to attach one module 102 to the next. The sliding dovetails join two modules together, having intersection points all along the sides of the modules 102. The continuous dovetail, or a portion thereof, runs along the entire length of each of the top, bottom, left, and right sides of a module, and allows back and forth sliding betwixt two modules. This allows the modules to be disassembled from the assembly by moving the module fore or aft in relation to the assembly 100. This allows flexibility and versatility in placing and removing each module 102. In accordance with the present invention, engagement portions 108 can be disposed on any or all sides of the module 102, including the front and back sides. The conduits 104 may be placed first, or the modules 102 may be assembled first and then the conduits placed therein. As shown in FIG. 6, various embodiments of the present invention, such as illustrated module 602 may employ dovetails 610, which are comprised of two dovetail portions 611 and 613, defined by each of module portions 603.

The sliding dovetail joint provides a strong interlocking mechanism. Sliding dovetails are assembled by sliding the tail 110 into the socket 112. The socket 112 may be slightly tapered to making it slightly tighter toward a relative "rear" of the joint, so that the two components can be slid together easily but the joint becomes tighter as the finished position is reached. On at least four of its sides, each module 102 comprises alternating tails 110 and sockets 112. In accordance with embodiments of the present invention, where there is a tail 110 on one side of the module, at the same location on a module's opposing side there is disposed a socket 112. The size, number, and shape of the engagement portions 108 can vary, to include, for example, square or other-shaped corners. For example, a module could comprise one large engagement portions per side, or several smaller engagement portions per side, depending upon the application of the module. The peripheral engagement portions, the dedicated aperture for storing only one object, and the ability to take apart each module 102 apart creates a robust, easy to use system that, relative to other systems, costs far less to manufacture and operate.

Although sliding joints are utilized in the illustrated embodiments of the modular support assembly 100, it should be understood that a module having an aperture that is dedicated to one object as well as engagement portions on all sides of the module can be contemplated wherein the engagement portions comprise fastening mechanisms other than a sliding mechanism. For example, one could envision snap-fit embodiments which may be useful.

As shown more clearly in FIGS. 2 through 6 each module 102 of the illustrated embodiments comprises two, generally identical, cooperative module portions or halves 103. Each portion 103 has a plurality of exterior engagement portions 108, as described above. Again, the number, size, type and the configuration of engagement portions 108 can vary depending upon the intended use of the module 102. Each portion also includes an interlock key 126 and an interlock channel 128 to interexchangeably join the module portions together as described in greater detail below, with reference to FIGS. 5 and 6.

Figure 8:
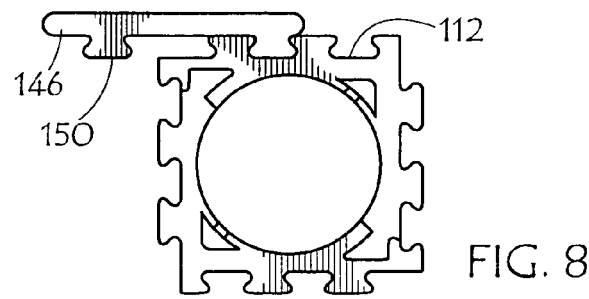
FIG. 8 is a front view of n embodiment of a module of the present invention joined to a load spreading washer.
Figure 9:
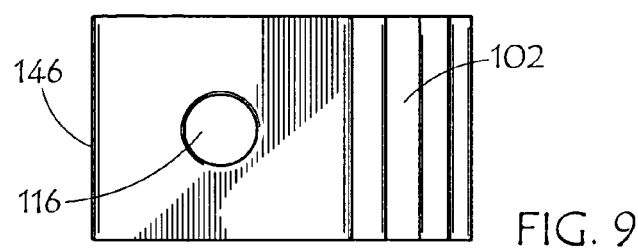
FIG. 9 is top view of the load spreading washer and module shown in FIG. 7.
Figure 7:
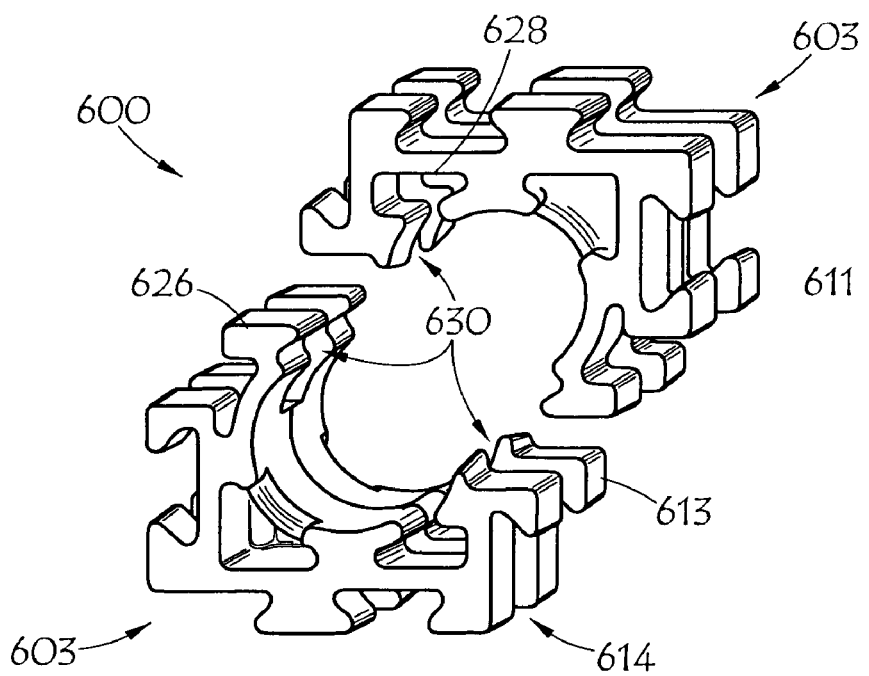
FIG. 7 is a perspective view of single module of FIG. 6 with the portion halves thereof separated.

Turning again to FIG. 1, the modules 102 further comprise a recess 114, such that when modules abut one another, passage 116 is created. Passage 116 may run through a central region of the module 102, generally perpendicular to aperture 106 and/or dovetails 108. A temporary securing fastener 118 may be inserted into the passage 116 to help prevent the modules from sliding away from one another. While a certain amount of slip or movement may be contemplated in some circumstances, preferably the assembly 100 would be held together in a secure fashion where movement between the modules would be generally arrested. Temporary securing fasteners 118 may be partially inserted into clearance 116 to keep adjacent modules 102 from sliding relative to one another during placement, refraining from locking the two modules together. The temporary fastener could then be replaced by another, more permanent fastener, such as illustrated bolt 120, once module 102 is in position. In certain embodiments a ridge on pin 118 may engage with a recess in passage 116 to keep pin 118 from sliding out of the passage. Also, in certain embodiments passage 116 alternates between two different diameters along its length to provide a place for the pin ridge to engage. Also, pin 118 may also allow use of a smaller fastener if desired. Passage 116 may receive a larger bolt, or pin 118, with a smaller bolt passing through pin 118 to secure assembly 100 to a structure. Conversely, the modules could be assembled without the use of a fastener. For instance, there may be applications where the modules are simply used to separate fluid lines and not clamp them to equipment. Also, in a large bundle of lines, fewer fasteners may be used, and pins may be utilized to lock the dove tails of a module 102 not having an adjacent fastener. While many securing devices could be envisioned, such as a rod, expansion pin, bolt, or other such securing device, a spring pin may be used to secure the modules 102 relative to one another. Passage 116 may be of any size to accept fasteners of standard and non-standard sizes. Passage 116 may or may not be threaded to accept and engage threaded fasteners; therefore, fasteners for non-threaded holes, such as those that expand to fill or draw up behind a metal plate, may also be used. Also shown in FIG. 1 is a sturdier securing fastener that can be easily removed from the module. The securing fastener in the illustrated embodiment of the present invention is bolt 120, employing washer 122. Bolt 120 may be any kind of bolt, such as a hex head, carriage, flange, shoulder, T-head, or cap screw (illustrated) and may pass through assembly 100 to secure the assembly to an underlying structure. Washer 122 may comprise any type of washer including flat, spring lock, tooth lock, serrated tooth lock washers, and so on. Load spreading washer 146, such as shown in FIGS. 7 and 8, may be employed to further distribute the load imparted on the assembly 100. Load-distributing washers 146 may include engagement portions 150 that cooperate with engagement portions 108 located on the sides of modules 102. A significant advantage of various embodiments of the present invention is that the use of a bolt 120, expansion pin 118, or the like in the modular support assembly 100 is optional, potentially lowering manufacturing costs relative to other support systems for fluid conduits. Additionally, the size of a fastener, such as bolt 120 may be selected based on a particular application. For example the size of the bolt may be limited, to discourage over-torquing, which might lead to deformation of system modules and/or damage to fluid conduits retained therein.

Within the body of assembly 100, spacers 124, 125 may be provided to accommodate combinations of various sizes of modules that store various sizes of conduits. For instance, vertical spacer 124 in the corner of FIG. 1 brings the height of the end stack up to match the adjacent stack so it can be bolted by bolt 120. It has recess 114 on its short sides. Horizontal spacers 125 in the middle of FIG. 1 fill in gaps. These spacers can also be used with a single conduit so that a module 102 can be fastened. The spacer and module together create a fastener hole 116 for a single module 102. In the illustrated embodiment of FIG. 1, spacers 124 and 125 help position fluid conduits 104 in an advantageous manner within the fluid conduit bundle. For example, the design of the modules 102 allows for a staggered assembly, where a lower row of modules 102 may be offset from the row directly above. Such versatility in design and configuration of the modules provides a unique and useful method of securing fluid conduits, or the like. The spacers 124 may comprise various dimensions, and may be placed within the assembly 100 in vertical or horizontal orientations. In accordance with the present invention, spacers 124 also have sliding dovetails engagement portions 108, assembled by sliding one or more tails 110 into one or more sockets 112. Spacers 124 may also be used to complete passage 116 when only one fluid conduit 104 is to be clamped, and therefore may further comprise a recess 114 so as to leave undisrupted the configuration of the assembly 100 and retain the option of applying a pin 118 or bolt 120 for the additional securement of the modular support assembly 100. Pin 118 may also fit into a flattened passage formed by a horizontal spacer 125 and other module or vertical spacer 124.

FIG. 2 illustrates examples of other embodiments of the present invention in which aperture 106 includes reliefs 107. Apertures 106 may comprise any shape or size, depending upon the desired use of the module. As seen in FIG. 2, aperture 106 may include reliefs 107. Reliefs 107 may be employed in both one-piece modules and two-piece modules and may extend all the way through the module or only partially into the module. These reliefs may comprise any shape or size, depending upon the desired use of the module 102. Relief 107 can provide strain relief and/or a certain amount of flex for insertion of conduits and/or assembly. Reliefs 107 may also be used to accommodate at least one adapter or insert, such as inserts 206 shown in FIG. 2. Inserts 206 can be removably inserted to change the size and/or shape of aperture 106 to accommodate smaller or differently sized or shaped objects retained therein for a secure fit. An adapter may comprise a smooth, wedge-shaped insert that could mate with a cooperating wedge-shaped insert disposed on an opposing surface of a conduit thereby surrounding the conduit snugly and securely without imposing pressure points to the conduit. A pressure point on a fluid conduit can create potentially hazardous situations including weakness in the conduit and ultimately failure. Thus, the relief 107 allows each size of module 102 to accommodate a range of fluid conduit sizes. In accordance with the present invention, there can be any number of reliefs 107 within module 102. For example, module 102 may comprise one relief 107 having sleeves disposed between the module and the conduit to accommodate smaller conduit sizes. This innate flexibility in design allows the modular support assembly 100 to be used in practically any application including applications in the mechanical, automotive, construction, recreation, electrical, and housing industries.

FIG. 3 demonstrates the ease in which support module 102 can be removed, by sliding, in its entirety from Modular Support Assembly 100, thus facilitating removal of a single conduit from a bundle. FIG. 4 shows module half 103 removed from a module, a feature which can be used to further ease removal of a single conduit from a bundle.

Figure 5:
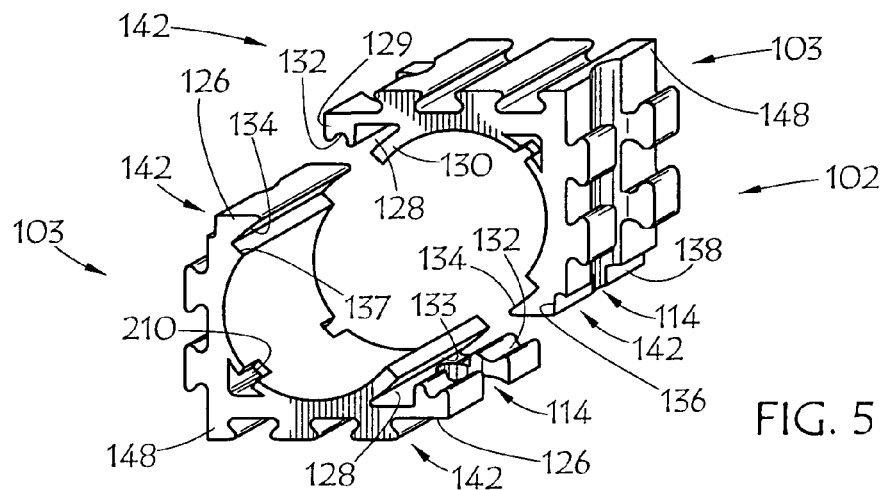
FIG. 5 is a reflected perspective view of an embodiment of a single module of the present invention, with the portions thereof separated.

A single two-piece module 102 is depicted in greater detail in FIG. 5. At each of its ends 142, each module portion 103 comprises either an interlock key 126 or an interlock channel 128. The interlock key 126 may comprise a trapezoidal shape end tail that neatly fits into the opposing module portion's interlock channel 128. This interlock channel may therefore comprise a cooperative end socket in the form of a trapezoidal-shaped groove or the like. In accordance with the present invention, the shape and size of the interlock key 126 and interlock channel 128 can vary and any and all possible combinations of size and shape of complementary cross-section of these components are incorporated herein.

As shown in FIG. 5, in embodiments such as shown in FIGS. 2 through 5, and FIGS. 7 and 8, the trapezoidal shaped interlock channel 128 may be defined by lip 130. Lip 130 is disposed along a central portion of module 102. Lip 130 includes an inner surface 131 and an outer surface 133. Inner surface 131 of lip 130 is integral with the surface of aperture 106. The outer surface of lip 130 forms a portion of the longitudinally-shaped channel that is interlock channel 128. Together with an opposing upright wall 129 that is disposed along the end 142 of module half 103, lip 130 forms interlock channel 128. Upright wall 129 runs along one side of the module portion 103 at its end 142. The dimensions and cross-section of all of these components, including upright wall 129, can vary depending upon the intended use of various embodiments of the present invention. Upright wall 129 further includes a concave channel 132 formed therein, that, when the module portions 103 converge, forms a whole socket 112 with a ledge 138 of the mating module half 103.

As also shown in FIG. 5, in embodiments such as shown in FIGS. 2 through 5, and FIGS. 7 and 8, interlock key 126 may comprise inner surfaces 134 and 137. Inner surface 137 abuts lip 130 of the mating module portion 103 to form a complete module 102. Interlock key 126 also comprises an outer wall 136 that is indented from the outer edge of the module portion 103, creating ledge 138. Ledge 138 is then mated with concave channel 132 of the mating module half 103 as interlock key 126 is slid into interlock channel 128 for a snug, secure fit. Alternative embodiments of the present invention might replace interlock keys and sockets 126 and 128 with snap-fit structures, or other cooperative fastening structures.

In various embodiments, such as those shown in FIGS. 2 through 4, truncated tails 148 may be disposed in a corner of a module. For example, in the illustrated embodiment of FIG. 2, lower right corner of left most module 102 would not fit if corner dovetail 148 was not truncated. Similarly, if the top module in FIG. 2 were positioned on a right corner rather than the left, its lower left corner wouldn't fit without a truncated corner dovetail. Also, as shown in FIG. 4, truncated tails 148 may facilitate for the attachment of large modules 102 with small modules. It should be understood that although modules 102 provide truncated tails 148 in the illustrated embodiments, other mechanisms could be contemplated to allow for the assembly of large modules 102 to smaller modules. For example, fewer engagement portions may be manufactured on selected sides of the module 102. Conversely, the assembly 100 could comprise same-sized modules that have consistently shaped tails.

An advantage of various embodiments of the present invention is that sliding module portions 103 can be easily removed from and attached to one another by the continuous dovetail sockets 112 and tails 110. The longitudinal engagement of the modules also allows the modules to be easily removed from the assembly 100. Slide and groove mechanisms other than dovetail joints can be considered for various embodiments of the present invention. For example, common woodworking joints such as a sliding boxtail joints, scarf, spline and continuous finger joints can be used. Other tongue and groove fastener configurations or joints can be used, as well as channel and elongated tab fasteners or joints, teeth fasteners or joints, or other forms of joints. Another example of a potentially useful joint in the present invention is the use of a dado joint. A dado joint is made by inserting the end of one module 102 into a rectangular groove (dado) located in another module. A rabbet joint involves joining one member to another member along a channel or notch (rabbet) that is disposed along an edge of one or both of the modules. The continuous finger joint could be used to lengthen a side of a module 102 by interlacing finger like projections. Similarly various configurations of interlocking channels and keys are contemplated. Examples of alternative socket-and-tail and key-and-channel configurations are shown in FIG. 6.

FIGS. 6 and 7 are perspective views of another embodiment of module 602 of the present invention. Portions 603 are shown joined together in FIG. 6 and disjoined in FIG. 7. Similar to the embodiments described above, each of portions 603 comprise engagement tails and sockets. However, in embodiment 602 dovetail 610 may comprise two dovetail portions 611 and 613, defined by each of module portions 603. Also, in this embodiment (and in the above described embodiments as well) the engagement dovetails and sockets on the sides of the module may differ from the size of the dovetails and slots on the top or bottom of the module. Such a configuration preferably encourages proper orientation of the modules (and module halves) during building of an assembly.

Interlocking key 626 and channel 628 in module 602 are shown as having different complementary shapes than the embodiments depicted in FIGS. 2-5. Preferably the interlock shown for module 602 is stronger and more resistant being pulled apart. The shapes of interlock key 626 and channel 628 also preferably provide a generally constant thickness in each module portion 603, facilitating molding. Also, split dovetail 610, discussed above is held together by adjacent modules in an assembly, further strengthening the interlocking of module portion 603 when the module is deployed as part of an assembly with the split dovetail being received by another module's socket.

Also, semicircular recesses 614 are defined in one end of each of module portions 603 such that there is no interlock or dovetail material at the parting line between joined modules. This preferably facilitates molding of modules portions 603 so as to enhance matching at the parting line. Resulting gap 630 at the parting line also allows module haves 603 to be assembled in modules, or the modules joined into an assembly or removed from an assembly by sliding the module half or only one-third of the module's thickness. This can be beneficial in tight installation.

Module embodiment 602, may also make use of an insert, such as insert 206, discussed above. Preferably the use of such an insert allows a limited number of modules sizes to be used with a greater number of conduit sizes. Reliefs 607 also facilitate providing a more constant thickness to module portions 603. Reliefs 607 preferably each define a slot to receive an insert tab, such as in a snap-fit manner.

Hence, in module 602, module portions 603 have a relatively constant thickness throughout, which should facilitate molding of portions 603, as molded parts will preferably cool more evenly and will not be as likely to "'sink" in thick areas.

As mentioned previously, historically, other support mechanisms require the removal of all inhibiting support blocks in order to access a conduit housed by a surrounded support block. An advantage provided by the modular support assembly 100 is that simple and easy removal of a conduit 104 can be achieved, even for those conduits located in surrounded modules. Without having to disassemble the assembly, embodiments of the present modular support assembly 100 allow removal of a module portion 103 or 603 of a module 102 or 602, removal of the conduit received therein, reinstallation of a replacement conduit of the same or different size, and reinstallation of the module portion 103 or 603. Exchanging modules or module portions is effected very easily without disassembly and reassembly of the modular support assembly 100. For example, should a conduit 104 be secured very tightly within the aperture 106 yet need to be drawn out from aperture 106, the module itself could simply be slid out from the rest of the assembly 100 without affecting the remainder of assembly 100.

A significant advantage of the present invention is the ability to apply the modules 102 or 602 to (around) conduits 104 after the conduits have been installed onto their corresponding equipment or placed in their final position. For example, conduit bundles transported in semi-truck trailers can be altered by the addition or removal of conduits much more safely than if conduits had to be removed. A module portion 103 or 603 can simply be slid onto or placed around the conduit and be mated with a cooperative module half 103 or 603 that has been similarly placed around the conduit. Another example of the heightened safety and ease of use provided by modular support assembly 100 is that when conduits are added to conduit bundles in a vertical orientation, modules 102 or 602 and module portions 103 or 603 can be slid onto the added conduit without removal of the previous conduit. Similarly, a significant benefit of various embodiments of the present invention is the ability to place modules 102 or 602 around conduit when the conduit or conduit bundle is suspended. During repair such as welding, disassembling, or construction of the conduit, it would be much safer and cost effective to provide the modular support assembly 100.

A further advantage of various embodiments of the present invention is that because each conduit 104 has a dedicated module 102 or 602, each conduit can be picked and placed within the module 102 or 602 without disrupting the entire assembly 100. Convenient attachment of conduit 104 to equipment can be achieved by providing the equipment with engagement portions that are cooperative with the engagement portions of the modules. In accordance with the present invention, the engagement portions of the equipment may also vary according to the function of the support assembly 100.

While some embodiments of the modular assembly may comprise modules of a rigid or semi-rigid, generally resilient material, such as molded plastic, it should be understood that any material could be used in the construction of the modules, depending upon the intended use of individual modules or of the entire assembly. For example, it may be of benefit to reduce vibration within a hydraulic line housed by the module. In this instance, a more light-weight module such as a module made from a composite might be more appropriate than a module constructed from steel. Noise may be reduced by providing wider, stackable blocks of a dampening material that are joined together at several points along the block. The modular assembly of the present invention can include modules of varying material composition within the same assembly. Different module material may be appropriate for one type of hose, while a stronger, heavier material could be used in the construction of a module that receives a metal pipe. The modules of differing material can then be interchanged at the user's discretion while maintaining the original structural integrity of the assembly. It may be desirable to neutralize or conduct electrical fields created by fluid flowing through the conduits, material selection for the modules may facilitate this.

Alternative embodiments of the present invention may call for modules that comprise inter-engageable joints on all six sides facilitating depth-wise planar joinder of the modules in addition to planar joinder provided in the horizontal and vertical directions. This may be of benefit when the supported generally elongated objects are of such substantial size and/or weight that additional support at one or more key points along the length of the object is desirable, when the object has a failure on or near the initial point of securement, or when the initial module requires replacing. For example, a new module could be added to an existing module for additional support during unforeseen mishaps such as pipe experiencing unexpected stress or loading.

In summary, the present invention provides a support mechanism for elongated objects such as fluid conduits that allows removing or adding a portion of a support block to the conduit in a plane that is longitudinal to the conduit retained therein. The modules 102 or 602 of the modular support assembly 100 are slidable in relation to each other, eliminating the need to remove entire rows of supports to access a conduit supported centrally within the assembly. Removing portions 103 or 603 of respective modules 102 or 602 allows for pick and place methods of adding/removing conduit and for post-installation of the assembly around already-existing and configured conduits 104 or conduit bundles, even with a large number of very heavy conduits that would otherwise demand very careful and time consuming operations to remove a conduit. The modular support assembly 100 is extremely robust and versatile and can accommodate objects of any size and type.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A support assembly comprising:
    a plurality of support modules, each comprising:
    an aperture to receive an elongated object defining a longitudinal direction;
    at least one engagement portion similarly disposed along each of at least four sides of an outside of each of said support modules, each of said support modules removably attachable to, and in exchangeable relationship with another of said support modules by longitudinally slidably engaging said at least one engagement portions such that said support modules cooperate in a removable, generally rigid manner to provide support for said object retained therein,
    wherein said engagement portion comprises a tail extending generally outward from, and generally longitudinally along, each said side outside of each of said support modules; and
    a tail receptive socket defined generally in, and extending generally longitudinally along, each said side outside of each of said support module, adjacent said tail.

2. The support assembly of claim 1, wherein said modules each further comprise at least one recess extending along said outside of said support modules, generally perpendicular to said aperture and the engagement portions, said recesses aligning when said support modules are engaged with one another to form a generally circular passage.

3. The support assembly as defined in claim 2 further comprises a fastener removably deployed through said passage to prevent pairs of said support modules from separating from one another, prevent pairs of modules from slipping and sliding relative to one another, and to secure the assembly to a structure.

4. The support assembly as defined in claim 3 wherein said fastener is temporary.

5. The support assembly as defined in claim 4 wherein the fastener is a hollow spring pin.

6. The support assembly as defined in claim 3 wherein the fastener is a bolt.

7. The support assembly as defined in claim 6 further comprising a load spreading washer having engagement portions thereon that engage with said engagement portions of said support modules.

8. The support assembly as defined in claim 1 wherein the modules engage one another in a slidable, cooperative fashion by sliding the engagement portions of each module together.

9. The support assembly as defined in claim 1 wherein said modules are separable from one another along a longitudinal axis of said objects received therein.

10. The support assembly as defined in claim 1 wherein said engagement portions and said support modules are integral such that modules are engageable with one another in a secure, planar fashion.

11. The support assembly as defined in claim 1 wherein each support module comprises two interengageable module portions.

12. The support assembly as defined in claim 11 wherein the module portions are assembled around the object and engaged with one another to securely retain the object.

13. The support assembly as defined in claim 11 wherein the module portions are assembled around the objects and engaged with one another after the objects have been positioned.

14. The support assembly as defined in claim 11, wherein said object retained by said module may be removed from said assembly by removing one module portion from the other module portion whereupon the object retained in the module is removable from the other module portion.

15. The support assembly as defined in claim 11 wherein the module portions each comprise module portion engagement portions.

16. The support assembly as defined in claim 15 wherein the module portion engagement portions comprise an interlock key and an interlock channel, said interlock key selectively engaging a respective interlock channel disposed on an engaging module portion to form a module.

17. The support assembly as defined in claim 1 wherein said at least one engagement portion is a dovetail tail and socket arrangement similarly disposed along each of said at least four sides.

18. The support assembly as defined in claim 17 wherein each said tail is disposed along an outside of said module and a socket is defined at a corresponding position on an opposite surface of said module.

19. The support assembly as defined in claim 1 wherein said support modules are of varying sizes to receive varying sizes of objects.

20. The support assembly as defined in claim 1 wherein said elongated objects are generally cylindrical.

21. The support assembly as defined in claim 20 wherein said generally cylindrical objects are fluid conduits.

22. The support assembly as defined in claim 1 wherein the aperture is circular.

23. The support assembly as defined in claim 1 wherein the apertures are of varying sizes to accommodate varying sizes of the objects retained therein.

24. The support assembly as defined in claim 1 wherein said aperture further comprises at least one relief.

25. The support assembly as defined in claim 24, further comprising a removable insert placed into said aperture and retained by said relief, decreasing the size of the aperture and accommodating varying sizes of objects.

26. The support assembly as defined in claim 1 wherein said engagement portions of said modules engage with a separate structure having engagement portions that are cooperative with said module engagement portions.

27. The support as defined in claim 2 further comprising spacers that fill in gaps resulting from the assemblage of varying sizes of modules.

28. The support assembly as defined in claim 27 wherein said spacers have recesses aligning with said recesses defined in said modules and other of said spacers when said spacers engage with said modules and with other of said spacers to form a passage.

29. The support assembly as defined in claim 1 wherein said modules comprise vibration dampening material.

30. The support assembly as defined in claim 1 wherein said modules comprise noise reducing material.

31. A support module comprising:
a pair of interchangeable interengageable module portion halves, each of said halves comprising:
a semi-circular aperture;
at least one engagement portion disposed along an outside of said module half, each of said engagement portions comprising:
a longitudinal tail extending outward from and along said outside of each of said module halves; and
a longitudinal tail receptive socket defined in and extending along said outside of each of said module halves, aside said longitudinal tail;
an interlock selectively locking said module halves together, said interlock comprising:
an interlock key extending along one edge of each of said halves; and
an interlock key receptive channel defined in the opposite edge of each of said halves; and
a recess defined generally perpendicular to said aperture half and said engagement portions, and intersecting said engagement portions along said outside of each of said halves.

32. The module defined in claim 31 wherein said tail is a dovetail which said socket corresponds to.

33. The module defined in claim 31 wherein said tail is comprised of a dovetail portion defined by each half, said dovetail portions defining a dovetail when said halves are interlocked.

34. The module as defined in claim 31 wherein a socket is defined on an opposite side of an interlocked module from each of said tails and a tail is defined on an opposite side of said interlocked module from each of said sockets.

35. The module as defined in claim 31 wherein said aperture further comprises at least one relief.

36. The module as defined in claim 35, further comprising a removable insert placed into said aperture and retained by said relief, decreasing the size of the aperture of an interlocked module.

37. A method comprising:
disposing an elongated object defining a longitudinal direction in a semi-circular aperture defined in a first support module half; and
longitudinally sliding a second support module half together with said first support module half, interlocking said module halves together by engaging an interlock key extending along one edge of one of said halves with an interlock key receptive channel defined in the other of said halves to form a resulting support module, capturing said object in a resulting circular aperture defined by the semicircular apertures of each half,
wherein said support module comprises a tail extending generally outward from, and generally longitudinally along, an outside of each of at least four similar sides of said support module; and
a tail receptive socket defined generally in, and extending generally longitudinally along, said outside of each of said at least four sides of said support module, adjacent said tail.

38. The method of claim 37 further comprising:
engaging engagement portions disposed along an outside of said module with engagement portions of an added module half by longitudinally sliding a tail extending outward from and along an outside of said module or the added module half into a socket defined in and extending along an outside of the other.

39. The method of claim 38, further comprising:
disposing another elongated object in a semi-circular aperture defined in said added module half; and
longitudinally sliding a second added module half together with the first added half, interlocking the added module halves together by engaging an interlock key extending along one edge of one of said added halves with an interlock key receptive channel defined in the other of the added halves, capturing the other object in a resulting circular aperture defined by the semicircular aperture of each added half.

40. The method of claim 39, further comprising:

fastening said modules to a structure by passing a fastener through a generally circular passage defined by adjacent joined recesses, each defined in each of said support module and said added module generally perpendicular to said aperture halves and said engagement portions, along an outside of each of said modules.

41. The method of claim 37 further comprising:

removing said object from said module by longitudinally sliding one of said support module halves apart from the other of said support module halves, unlocking said module halves from each other by disengaging each of said interlock keys from each of said channels.

* * * * *